(12) United States Patent
Kim et al.

(10) Patent No.: US 11,794,536 B2
(45) Date of Patent: Oct. 24, 2023

(54) VEHICLE CONTROL SYSTEM AND VEHICLE CONTROL METHOD FOR DETERMINING CHANCE OF COLLISION

(71) Applicant: HL KLEMOVE CORP., Incheon (KR)

(72) Inventors: Jae Suk Kim, Yongin-si (KR); Tak Gen Kim, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 651 days.

(21) Appl. No.: 16/654,240

(22) Filed: Oct. 16, 2019

(65) Prior Publication Data

US 2020/0114710 A1    Apr. 16, 2020

(30) Foreign Application Priority Data

Oct. 16, 2018  (KR) .................... 10-2018-0123210

(51) Int. Cl.
  *B60W 50/14*       (2020.01)
  *B60D 1/36*        (2006.01)
  *B60W 30/095*      (2012.01)

(52) U.S. Cl.
  CPC .......... *B60D 1/363* (2013.01); *B60W 30/0956* (2013.01); *B60W 2300/14* (2013.01); *B60W 2420/42* (2013.01)

(58) Field of Classification Search
  CPC ..... B60D 1/363; B60D 1/62; B60W 30/0956; B60W 2300/14; B60W 2420/42; B60W 2050/143; B60W 2530/205; B60W 30/0953; B60W 30/18036; B60W 50/14; B60W 2050/0005; B60W 30/08; B60W 40/02; B60W 2050/146; B60W 2300/145; B60W 2420/506; B60W 2420/54;
  (Continued)

(56) References Cited

U.S. PATENT DOCUMENTS 8,260,538 B2 *  9/2012  Noda ..................... B60T 7/22
                                              342/107
9,885,775 B2 *  2/2018  Holtman ................ G06T 7/70
                        (Continued)

FOREIGN PATENT DOCUMENTS

KR     10-2016-0041445 A    4/2016

OTHER PUBLICATIONS

Korean Office Action dated Jul. 18, 2023 for corresponding Korean Patent Application No. 10-2018-0123210, 16 pages.

*Primary Examiner* — Donald J Wallace
*Assistant Examiner* — Daniel M. Robert
(74) *Attorney, Agent, or Firm* — Hauptman Ham, LLP

(57) ABSTRACT

Provided is a vehicle control system, a vehicle control method, and an image sensor, the vehicle control system including: an image sensor disposed on the vehicle to have a field of view of an outside of the vehicle to capture image data; at least one non-image sensor disposed on the vehicle to have a field of sensing of the outside of the vehicle to capture sensing data; at least one processor configured to process the image data captured by the image sensor and the sensing data captured by the non-image sensor; and a controller configured to determine a chance of a collision with an obstacle with respect to a rear side warning determination reference area that is changed depending on whether a trailer is mounted on the vehicle, on the basis of at least part of processing at least one of the image data and the sensing data.

17 Claims, 12 Drawing Sheets

(58) Field of Classification Search
CPC ........ B60W 2552/50; B60W 2554/802; B60Y 2200/148
See application file for complete search history.

(56) References Cited

U.S. PATENT DOCUMENTS

| | | | | |
|---|---|---|---|---|
| 2008/0312832 | A1* | 12/2008 | Greene | G08G 1/165 |
| | | | | 701/301 |
| 2014/0222288 | A1* | 8/2014 | Lavoie | G06F 17/00 |
| | | | | 701/99 |
| 2016/0119539 | A1* | 4/2016 | Tan | G01S 5/0284 |
| | | | | 348/148 |
| 2016/0152208 | A1* | 6/2016 | Ewert | B60R 21/0136 |
| | | | | 701/46 |
| 2016/0252610 | A1* | 9/2016 | Smith | G01S 7/411 |
| | | | | 342/27 |
| 2017/0174128 | A1* | 6/2017 | Hu | G06T 7/74 |
| 2017/0363727 | A1* | 12/2017 | Prasad | B60W 40/12 |
| 2018/0157925 | A1* | 6/2018 | Zeviar | G06V 10/147 |
| 2018/0284781 | A1* | 10/2018 | Cohen | B60W 30/06 |
| 2018/0362026 | A1* | 12/2018 | Heimberger | B60W 30/18036 |
| 2019/0056492 | A1* | 2/2019 | Geiger | G01S 13/931 |
| 2019/0061750 | A1* | 2/2019 | Tamura | B60W 50/0097 |
| 2019/0322317 | A1* | 10/2019 | Pourrezaei Khaligh | |
| | | | | B60W 40/00 |
| 2020/0010018 | A1* | 1/2020 | Maruoka | B62D 13/06 |
| 2020/0031276 | A1* | 1/2020 | Noh | B60W 40/12 |
| 2021/0019904 | A1* | 1/2021 | Selensky | B62D 15/023 |

\* cited by examiner

VEHICLE CONTROL SYSTEM AND VEHICLE CONTROL METHOD FOR DETERMINING CHANCE OF COLLISION

CROSS-REFERENCE TO RELATED APPLICATION

This application is based on and claims priority under 35 U.S.C. § 119 to Korean Patent Application No. 10-2018-0123210, filed on Oct. 16, 2018 in the Korean Intellectual Property Office, the disclosure of which is incorporated herein by reference.

BACKGROUND

1. Field

The present disclosure relates to a vehicle control system and a vehicle control method.

2. Description of the Related Art

A rear side warning device for a vehicle is a device that alerts a driver when there is a chance of a collision with an object detected in the rear side of the travelling vehicle with respect to a predetermined boundary line.

The rear side warning device may include a blind spot detection (BSD) system and a rear cross traffic alert (RCTA) system for detecting an obstacle located in a sensing area with respect to a rear side of the vehicle and alerting a driver, and a lane change assist (LCA) system for determining a chance of a collision of a vehicle changing lanes with another vehicle approaching the vehicle from the rear side of the vehicle at a high velocity and alerting a driver.

On the other hand, a vehicle may be connected to a trailer that is designed for carrying baggage or for camping. In this case, a trace of movement of the trailer allows the trailer to be located on a predetermined boundary line, which serves as a criterion for determining the chance of a collision, which may causes the rear side warning device to erroneously operate.

Accordingly, there is a need for a technology capable of changing a predetermined boundary line or a predetermined determination reference area in response to a trailer being connected to a vehicle and controlling the rear side warning device to properly perform a warning operation.

SUMMARY

Therefore, it is an object of the present disclosure to provide a vehicle control system, an image sensor, and a vehicle control method, capable of preventing an erroneous control by changing a criterion for determining a warning situation even when a trailer is mounted on a vehicle.

It is another object of the present disclosure a vehicle control system, an image sensor, and a vehicle control method, capable of providing the driver with driving stability and driving convenience by avoiding an obstacle approaching the vehicle from the rear side of the vehicle.

Additional aspects of the invention will be set forth in part in the description which follows and, in part, will be obvious from the description, or may be learned by practice of the invention.

In accordance with one aspect of the present invention, a vehicle control system includes: an image sensor disposed on the vehicle to have a field of view of an outside of the vehicle to capture image data; at least one non-image sensor disposed on the vehicle to have a field of sensing of the outside of the vehicle to capture sensing data; at least one processor configured to process the image data captured by the image sensor and the sensing data captured by the non-image sensor; and a controller configured to determine a chance of a collision with an obstacle with respect to a rear side warning determination reference area that is changed depending on whether a trailer is mounted on the vehicle, on the basis of at least part of processing at least one of the image data and the sensing data, wherein the controller is configured to: determine whether the trailer is mounted on the vehicle on the basis of reception of a trailer mounting signal, change, in response to determining that the trailer is mounted on the vehicle, a rear side warning determination reference area that is previously set before the trailer is mounted on the vehicle, to thereby set a plurality of rear side warning determination reference areas.

In accordance with another aspect of the present invention, a vehicle control system includes: an image sensor disposed on the vehicle to have a field of view of an outside of the vehicle to capture image data; at least one non-image sensor disposed on the vehicle to have a field of sensing of the outside of the vehicle to capture sensing data; a rear side warning module configured to prevent an obstacle approaching the vehicle from the rear side of the vehicle; and a domain control unit configured to process at least one of the image data captured by the image sensor and the sensing data captured by the non-image sensor, and to control at least one driving assistance system including the rear side warning module and provided in the vehicle, wherein the domain control unit is configured to determine whether a trailer is mounted on the vehicle on the basis of reception of a trailer mounting signal, and change, in response to determining that the trailer is mounted on the vehicle, a rear side warning determination reference area that is previously set before the trailer is mounted on the vehicle, to thereby set a plurality of rear side warning determination reference areas.

In accordance with another aspect of the present invention, an image sensor is disposed on the vehicle to have a field of view of an outside of the vehicle to capture image data, wherein the image data is processed by a processor to be used for setting a plurality of rear side warning determination reference areas by changing a previously set rear side warning determination reference area, wherein the plurality of rear side warning determination reference areas includes: a first rear side warning determination reference area that is set to correspond to an area of the previously set rear side warning determination reference area that is offset by an overlap area of the previously set rear side warning determination reference area that overlaps the trailer; and a second rear side warning determination reference area that is set to corresponding to a position of the trailer.

In accordance with another aspect of the present invention, a method of controlling a vehicle includes: determining whether a trailer is mounted on the vehicle on the basis of reception of a trailer mounting signal; changing, in response to determining that the trailer is mounted on the vehicle, a rear side warning determination reference area that is previously set before the trailer is mounted on the vehicle, to thereby set a plurality of rear side warning determination reference areas; and determining a chance of a collision with an obstacle with respect to at least one of the plurality of rear side warning determination reference areas.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, the exemplary embodiment of the present disclosure will be described with reference to the accompanying drawings in detail. Although the terms "first," "second," "A," "B," etc. may be used to describe various components, the terms do not limit the corresponding components, and the order or sequence thereof, but are used only for the purpose of distinguishing one component from another component. It will be understood that when an element is referred to as being "connected" or "coupled" to another element, it can be directly connected or coupled to the other element or intervening elements may be present.

Figure 1:
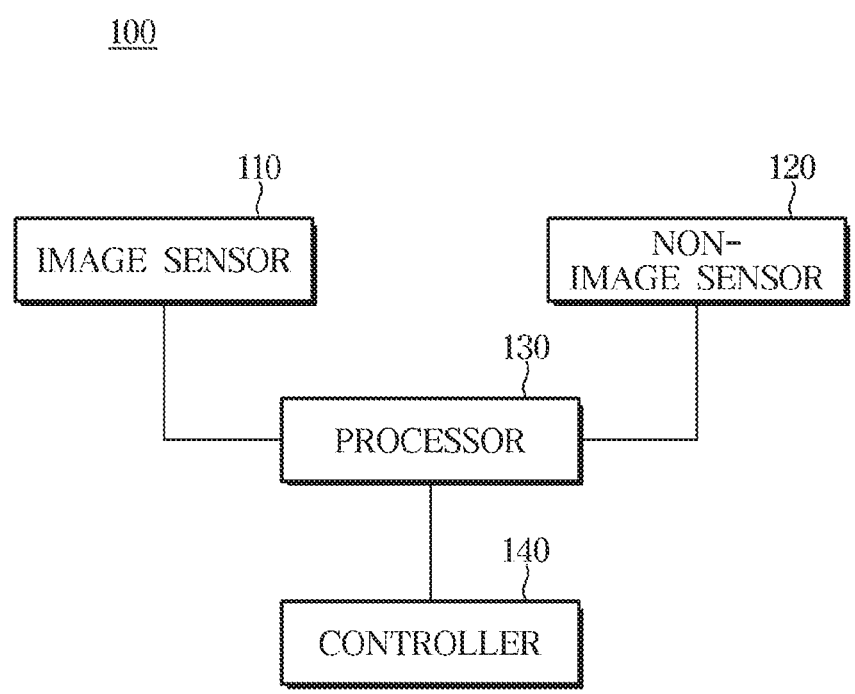
FIG. 1 is a view illustrating the configuration of a vehicle control system according to the present disclosure.

FIG. 1 is a view illustrating the configuration of a vehicle control system 100 according to the present disclosure.

Referring to FIG. 1, the vehicle control system 100 according to the present disclosure includes an image sensor 110, a non-image sensor 120, a processor 130, a controller 140, and the like.

The image sensor 110 may be disposed on a vehicle to have a field of view with respect to the outside of the vehicle to capture image data. Here, the field of view with respect to the outside of the vehicle may refer to a sensing area of the outside of the vehicle.

The image sensor 110 may include at least one image sensor, and the at least one image sensor 110 may be mounted on each part of the vehicle to have a field of view of the front, side, or rear of the vehicle.

Since image information photographed by the image sensor 110 is composed of image data, the image information may refer to image data captured by the image sensor 110. Hereinafter, image information photographed by the image sensor 110 refers to image data captured by the image sensor 110.

Image data captured by the image sensor 110 may be generated in one format of raw AVI, MPEG-4, H.264, DivX, and JPEG. Image data captured by the image sensor 110 may be processed by the processor 130.

The non-image sensor 120 may be disposed on the vehicle to have a field of sensing with respect to the outside of the vehicle to capture sensing data.

The non-image sensor 120 may include at least one non-image sensor, such as a radar, a LIDAR, an ultrasonic sensor, and the like.

Sensing data captured by the non-image sensor 120 may be processed by the processor 130.

The processor 130 may be configured to process image data captured by the image sensor 110 and sensing data captured by the non-image sensor 120, and may include at least one processor.

Here, the processor 130 may process the image data and the sensing data to acquire a distance between the vehicle and the trailer, an image of the trailer, and the like, and may output the acquire distance, image, and the like to the controller 140.

The controller 140 may be configured to determine a chance of a collision with an obstacle with respect to a rear side warning determination reference area that is changed depending on whether a trailer is mounted on the vehicle, on the basis of at least part of processing of at least one of the image data and the sensing data, In detail, the controller 140 may determine whether the trailer is mounted on the vehicle on the basis of reception of a trailer mounting signal; change, in response to determining that the trailer is mounted on the vehicle, a rear side warning determination reference area that is previously set before the trailer is mounted on the vehicle, to thereby set a plurality of rear side warning determination reference areas.

Here, the trailer mounting signal may be an electrical signal generated inside or outside the vehicle and transmitted to the controller 140.

As one example, when the driver presses a button disposed in the vehicle, a trailer mounting signal is generated. As another example, when the vehicle and the trailer are connected through a connecting shaft, a trailer mounting signal is generated by the connecting shaft.

Here, the rear side warning determination reference area is an area serving as a criterion for determining a chance of a collision with another vehicle. The rear side warning determination reference area may be included in a sensing area with respect to the rear side of the vehicle. The size and the shape of the rear side warning determination reference area may be variously set according to an entrance path of another vehicle and whether the trailer is mounted on the vehicle.

Here, various types of trailers may be applied to the present disclosure regardless of its intended use, and the obstacle may include a vehicle, a motorcycle, a person, and the like.

Meanwhile, the processor 130 and the controller 140 may be implemented as a domain control unit (DCU) that controls a function of a processor that processes data and a rear side warning module.

Here, the rear side warning module may refer to a module for performing a driving assistance system (DAS), such as a blind spot detection (BSD) system and a rear cross traffic alert (RCTA) system, for detecting the rear side of the vehicle and determining the chance of collision with another vehicle.

The DCU may be configured to receive image data captured by the at least one image sensor 110 and receives sensing data captured by the at least one non-image sensor 120 to process at least one of the image data and the sensing data. The DCU may include at least one processor for the processing.

The DCU may be provided in the vehicle and communicate with the at least one image sensor 110 and the at least one non-image sensor 120 mounted in the vehicle. To this end, the DCU may further include an appropriate data link or communication link, such as a vehicle network bus for data transmission or signal communication.

That is, the vehicle control system 100 according to the present disclosure, which may be implemented using the DCU, includes the image sensor 110 disposed on the vehicle to have a field of view of an outside of the vehicle to capture image data, the non-image sensor 120 disposed on the vehicle to have a field of sensing of an outside of the vehicle to capture sensing data, the rear side warning module configured to prevent a collision with an obstacle approaching the vehicle from the rear side of the vehicle, and the DCU configured to process at least one of the image data captured by the image sensor 110 and the sensing data captured by the non-image sensor 120 and control at least one driving assistance system (DAS) including the rear side warning module and provided in the vehicle, in which the DCU determines whether a trailer is mounted on the vehicle on the basis of reception of a trailer mounting signal, and change, in response to determining that the trailer is mounted on the vehicle, a rear side warning determination reference area that is previously set before the trailer is mounted on the vehicle to thereby set a plurality of rear side warning determination reference areas.

Hereinafter, an embodiment in which a vehicle capable of performing the vehicle control system according to the present disclosure determines a chance of a collision with another vehicle is described.

Figure 2:
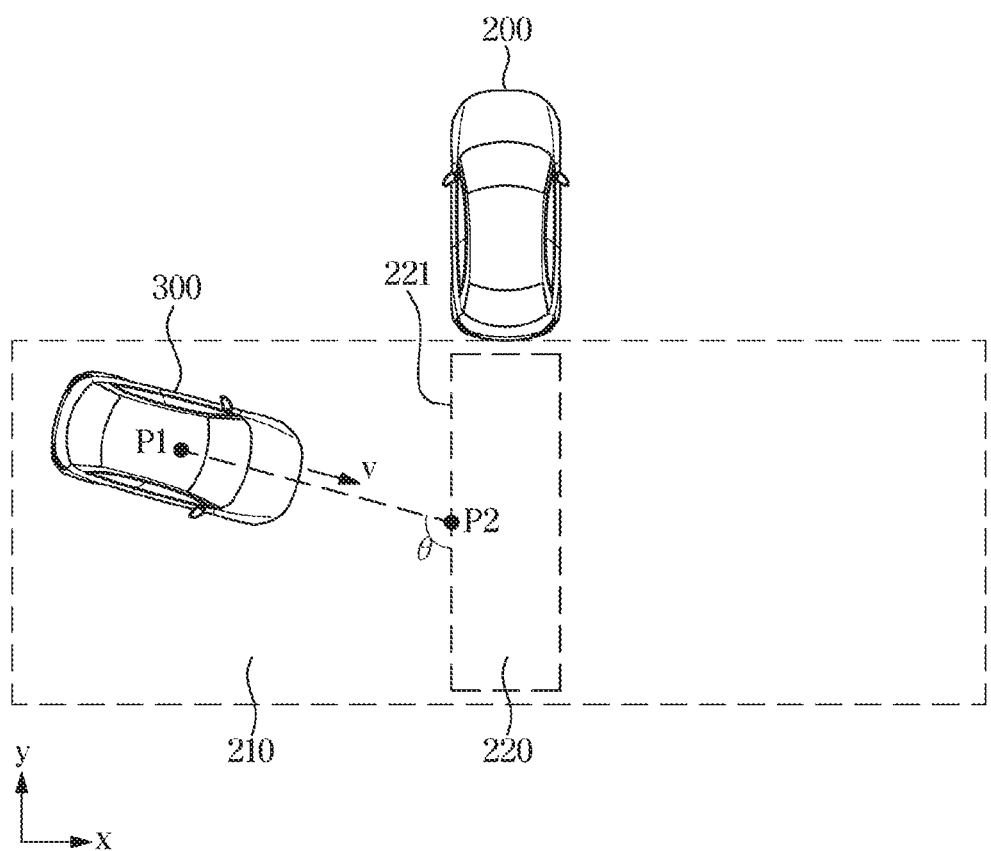
FIG. 2 is a view for describing a rear side warning operation of a vehicle according to the present disclosure.

FIG. 2 is a view for describing a rear side warning operation of a vehicle according to the present disclosure.

Referring to FIG. 2, a vehicle 200 according to the present disclosure may include a sensing area 210 with respect to the rear side of the vehicle 200 and a previously set rear side warning determination reference area 220.

Here, the sensing area 210 with respect to the rear side may be determined according to the performance of at least one of the image sensor 110 and the non-image sensor 120. The longitudinal size of the sensing area 210 of the vehicle may vary according to the velocity of the vehicle 200.

Here, the rear side warning determination reference area 220 has a predetermined boundary line 221. The shape of the boundary line 221 may vary without being limited to the shape shown in FIG. 2.

In this case, when another vehicle 300 approaches the vehicle 200, the vehicle control system 100 according to the present disclosure may acquire a relative velocity v (or a relative velocity vector) of the vehicle 200 and the other vehicle 300 and position coordinates P1 of the other vehicle 300 from a result of the processing of the at least one of the image sensor 110 and the non-image sensor 120.

Thereafter, the vehicle control system 100 determines whether the acquired relative velocity v is within a previously set reference velocity range. The setting of the reference velocity range is to exclude a stationary object and an object approaching at a very high relative velocity. The minimum value and the maximum value of the reference velocity range may be determined through design, experiment, and the like. However, the method of setting the reference velocity range is not limited thereto.

When the relative velocity v is within the reference velocity range, the vehicle control system 100 according to the present disclosure calculates intersection coordinates P2 at which the other vehicle 300 encounters the boundary line of the previously set rear side warning determination reference area using the relative velocity v of the other vehicle 300.

Thereafter, the vehicle control system 100 according to the present disclosure measures the direction of the relative velocity v of the other vehicle 300 and the angle θ of the other vehicle 300 with respect to the boundary line using the position coordinates P1 of the other vehicle 300 and the intersection coordinates P2 on the boundary line 221 of the rear side warning determination reference area 220, and determines whether the measured angle θ is within a previously set reference angle range. Here, the reference angle range is a range set by consideration of a limited sensing area of at least one of the image sensor 110 and the non-image sensor 120.

When the angle θ is within the reference angle range, the vehicle control system 100 according to the present disclosure calculates a time to collision (TTC) of the other vehicle 300 with the boundary line using the position coordinates P1 and the intersection coordinates P2 of the other vehicle 300, and determines the chance of a collision with the other vehicle 300.

Figure 3:
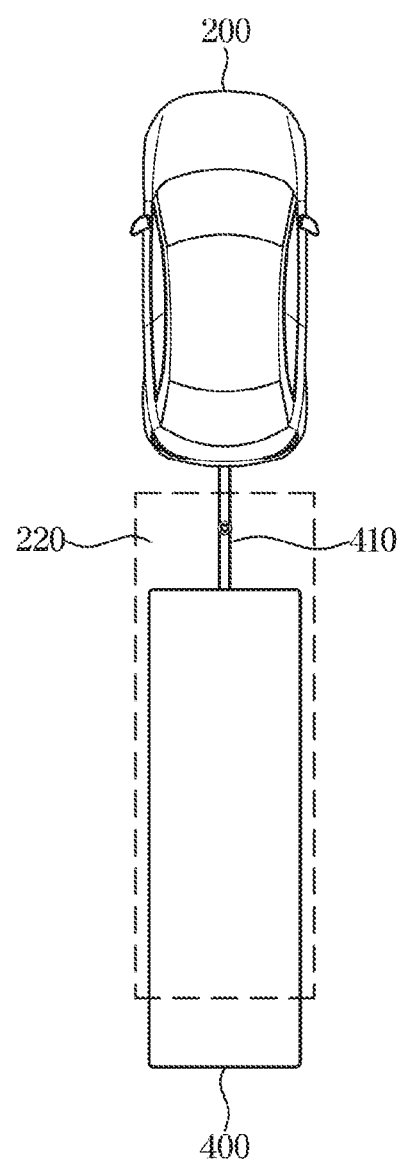
FIG. 3 is a view illustrating an embodiment in which a vehicle and a trailer are connected to each other according to the present disclosure.
Figure 4:
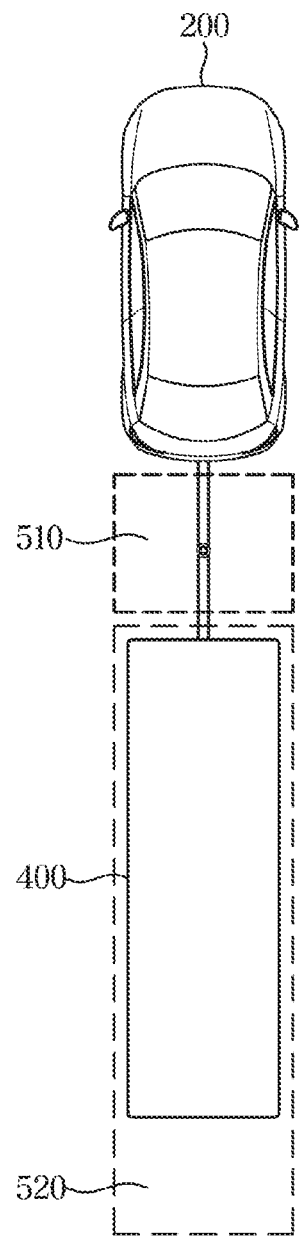
FIG. 4 is a view illustrating an embodiment of a plurality of rear side warning determination reference areas set according to the present disclosure.

FIG. 3 is a view illustrating an embodiment in which a vehicle and a trailer are connected to each other according to the present disclosure, and FIG. 4 is a view illustrating an embodiment of a plurality of rear side warning determination reference areas set according to the present disclosure.

Referring to FIGS. 3 and 4, a trailer 400 is mounted on the vehicle 200 according to the present disclosure through a connecting shaft 410. Here, the connecting shaft 410 may be disposed on the vehicle 200, may be disposed on the trailer 400, or may be disposed on each of the vehicle 200 and the trailer 400, or may be a separate member.

In this case, the vehicle 200 and the trailer 400 may have different sizes, and the vehicle 200 and the trailer 400 may have different traces of movement in which the trace of movement of the trailer 400 varies with the trace of movement of the vehicle 200.

When the trailer 400 is mounted on the vehicle 200, the trailer 400 is generally located on the rear side warning determination reference area 220 of the vehicle 200.

In this case, when the vehicle control system 100 according to the present disclosure determines the chance of a collision in the same manner as described above with reference to FIG. 2 without changing the rear side warning determination reference area 220, an erroneous operation occurs due to the size and the trace of movement of the trailer 400. Accordingly, there is a need to set a plurality of rear side warning determination reference areas having the size and shape changed from the previously set rear side warning determination reference area 220 as shown in FIG. 4, for example, a first rear side warning determination reference area 510 and a second rear side warning determination reference area 520.

Hereinafter, an embodiment in which a plurality of rear side warning determination reference areas are set according to the present disclosure will be described in detail.

Figure 5:
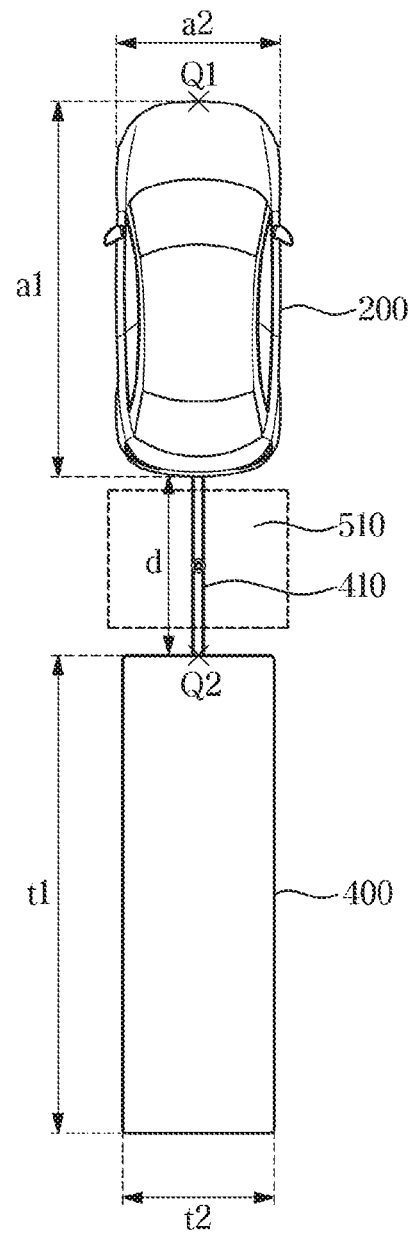
FIG. 5 is a view illustrating an embodiment in which a first rear side warning determination reference area is set according to the present disclosure.

FIG. 5 is a view illustrating an embodiment in which a first rear side warning determination reference area is set according to the present disclosure.

Referring to FIGS. 2 and 5, the controller 140 according to the present disclosure may check an overlap area of the previously set rear side warning determination area 220 that overlaps the trailer 400, and set an area of the previously set rear side warning determination reference area 220 that is offset by the overlap area as the first rear side warning determination area 510.

In this case, the overlap area may be identified using previously stored coordinates of the front side of the vehicle 200, the longitudinal length of the vehicle 200, the interval between the vehicle 200 and the trailer 400, and the like.

For example, the controller 140 adds a previously stored longitudinal length a1 of the vehicle 200 to a longitudinal component of the previously stored coordinates Q1 of the front side of the vehicle to obtain a first result, and then adds a distance between the vehicle 200 and the trailer 400 acquired by at least one of the image data and the sensing data or a previously stored length of the connecting shaft 410 to the first result, to thereby estimate a position Q2 of a front side of the trailer 400. Thereafter, the controller 140 identifies an area (an overlap area) from the estimated position Q2 of the front side of the trailer 400 to an end portion of the rear side warning determination reference area 220.

Here, the offsetting of the overlap area from the rear side warning determination reference area 220 represents controlling the overlap area in the rear side warning determination reference area 200.

The first rear side warning determination reference area 510 may be formed between the vehicle 200 and the trailer 400. The size of the first rear side warning determination reference area 510 may be variously adjusted according to the size of the trailer 400.

In detail, the controller 140 may determine the longitudinal length of the first rear side warning determination reference area 510 on the basis of at least one of: the distance d between the vehicle 200 and the trailer 400 acquired by the result of the processing of at least one of the image data and the sensing data; and previously stored information about the size of the connecting shaft 410, and may determine the traverse length of the first rear side warning determination reference area 510 on the basis of at least one of a traverse length t2 of the trailer 400 and a previously stored traverse length a2 of the vehicle 200.

For example, the controller 140 may determine the longitudinal length of the first rear side warning determination reference area 510 to correspond to the distance d between the vehicle 200 and the trailer 400, and may determine the traverse length of the first rear side warning determination reference area 510 to correspond to the traverse length t2 of the trailer 400.

Here, when the controller 140 determines the traverse length of the first rear side warning determination reference area 510 using the traverse length t2 of the trailer, the traverse length t2 of the trailer 400 may be determined depending on whether the trailer mounting signal includes information about the size of the trailer 400.

As one example, when the trailer mounting signal includes size information about the size of the trailer 400, the controller 140 may extract the traverse length t2 of the trailer 400 from the trailer mounting signal.

As another example, when the trailer mounting signal does not include size information about the size of the trailer 400, the controller 140 may estimate the traverse length t2 of the trailer 400 from the result of the processing of at least one of the image data and the sensing data or from previously stored trailer average size information.

On the other hand, the controller 140 may compare the traverse length t2 of the trailer 400 with the previously stored traverse length a2 of the vehicle to determine a longer traverse length between the traverse length t2 and the traverse length a2, and may determine the traverse length of the first rear side warning determination reference area 510 to correspond to the longer traverse length. Accordingly, even with various shapes of the trailer 400, an erroneous detection due to the size of the vehicle 200 or the trailer 400 is prevented from occurring.

The above described embodiment may be applied to the DCU that is implemented by a combination of the processor 130 and the controller 140.

Figure 6:
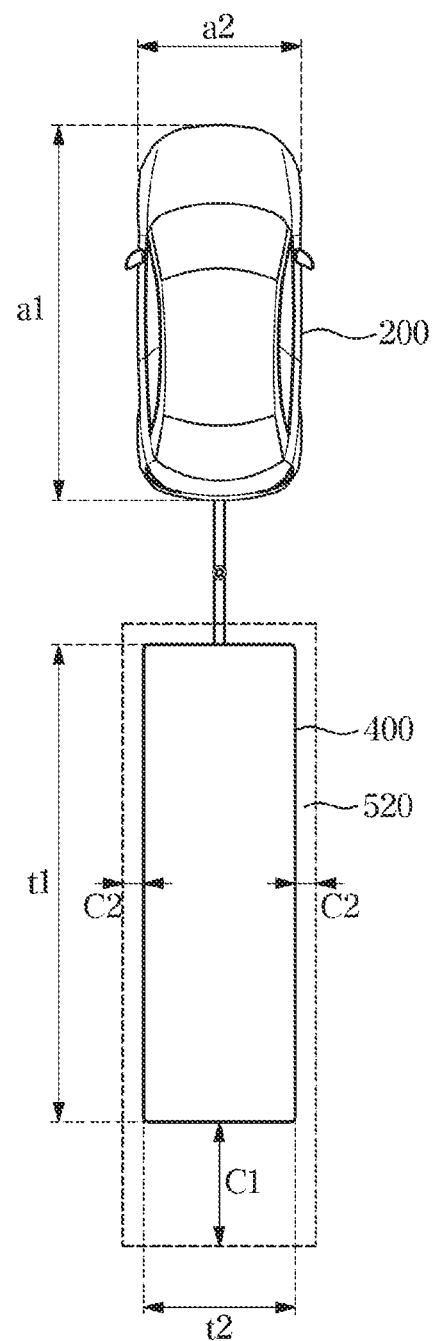
FIG. 6 is a view illustrating an embodiment in which a second rear side warning determination reference area is set according to the present disclosure.

FIG. 6 is a view illustrating an embodiment in which the second rear side warning determination reference area 520 is set according to the present disclosure.

Referring to FIGS. 2 and 6, the controller 140 according to the present disclosure may set the second rear side warning determination reference area 520 corresponding to the position of the trailer 400.

In this case, the controller 140 may set the second rear side warning determination reference area 520 corresponding to the position of the trailer 400 in which the longitudinal length of the second rear side warning determination reference area 520 is determined by adding a previously set first calibration length c1 or a longitudinal length a1 of the vehicle 200 to a longitudinal length t1 of the trailer 400, and the traverse length of the second rear side warning determination reference area 520 is determined by adding a previously set second calibration length c2 or a traverse length a2 of the vehicle 200 to a traverse length t2 of the trailer 400.

For example, the controller 140 may set the second rear side warning determination reference area 520 to correspond to the position of the front side of the trailer 400 as described above with reference to FIG. 5, and may determine the longitudinal length of the second rear side warning determination reference area 520 by adding a previously set first calibration length c1 to a longitudinal length t1 of the trailer 400, and determine the traverse length of the second rear side warning determination reference area 520 by adding a previously set second calibration length c2 to a traverse length t2 of the trailer 400.

Here, the longitudinal length t1 and the traverse length t2 of the trailer 400 may be determined depending on whether the trailer mounting signal includes information about the size of the trailer 400.

As one example, when the trailer mounting signal includes size information about the size of the trailer 400, the controller 140 may extract the longitudinal length t1 and the traverse length t2 of the trailer 400 from the trailer mounting signal.

As another example, when the trailer mounting signal does not include size information about the size of the trailer 400, the controller 140 may estimate the longitudinal length t1 and the traverse length t2 of the trailer 400 from the result of the processing of at least one of the image data and the sensing data or from previously stored trailer average size information.

The above described embodiment may be applied to the DCU that is implemented by a combination of the processor 130 and the controller 140.

When the trailer 400 is mounted on the vehicle 200, the trailer 400 moves according to the driving direction of the vehicle 200 and forms a predetermined tiling angle with respect to the connecting shaft 410. In this case, the changed first and second rear side warning determination reference areas 510 and 520 need to be corrected according to the tilting angle.

Figure 7:
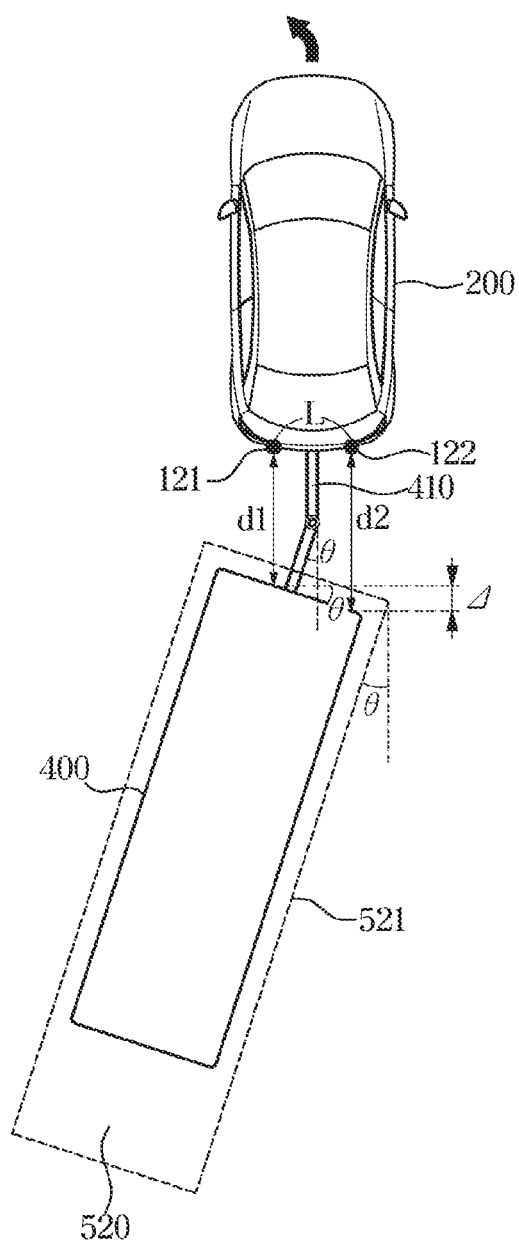
FIG. 7 is a view illustrating a first embodiment in which a rear side warning determination reference area is set with respect to a tilting trailer according to the present disclosure.

FIG. 7 is a view illustrating a first embodiment in which a rear side warning determination reference area is set with respect to a tilting trailer according to the present disclosure.

Referring to FIG. 7, when the vehicle 200 according to the present disclosure turns left or right, the trailer 400 is also tilted according to the turning direction of the vehicle 200. In this case, the controller 140 may obtain the tilting angle of the trailer 400 using the result of the processing of a plurality of pieces of sensing data captured by a plurality of the non-image sensors 120 and distances between the plurality of the non-image sensors 120.

For example, the non-image sensor 120 may include a first non-image sensor 121 for capturing a first sensing data and a second non-image sensor 122 for capturing a second sensing data, and the controller 140 may calculate a titling angel θ of the trailer 400 with respect to a reference axis 410 of the vehicle using a previously stored inter-sensor interval L between the first non-image sensor 121 and the second non-image sensor 122, a first distance d1 between the first non-image sensor 121 and the trailer 400 acquired by the result of the processing of the first sensing data, and a second distance d2 between the second non-image sensor 122 and the trailer 400 acquired by the result of the processing of the second sensing data.

Here, the tilting angle θ of the trailer 400 may be calculated using a tangent value tang with respect to the inter-sensor interval L and a difference value A between the first distance d1 and the second distance d2.

The controller 140 sets at least one of the first rear side warning determination reference area 510 and the second rear side warning determination reference area 520 to correspond to the tilting angle θ.

For example, the controller 140 may set the second rear side warning determination reference area 520 by correcting the boundary line of the first rear side warning determination reference area 510 to correspond to the calculated tilting angle θ of the trailer 400.

On the other hand, the controller 140 may obtain the tilting angle of the trailer 400 using the result of the processing of the image data captured by the image sensor 110.

Figure 8:
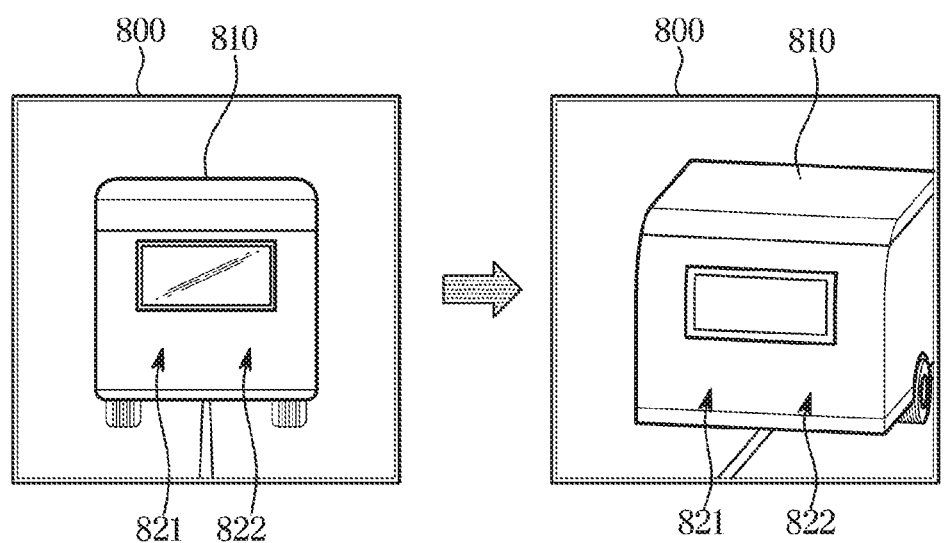
FIG. 8 is a view illustrating a second embodiment in which a rear side warning determination reference area is set with respect to a tilting trailer according to the present disclosure.

FIG. 8 is a view illustrating a second embodiment in which a rear side warning determination reference area is set with respect to a tilting trailer according to the present disclosure.

Referring to FIG. 8, the vehicle according to the present disclosure may include a display device (not shown) capable of displaying an image. The controller 140 may control the display device to display various images obtained by the result of the processing of the image data on a screen 800 thereof.

The controller 140 extract a trailer image 810 through the result of the processing of the image data, and the trailer image 810 is displayed on the screen 800 of the display device. In addition, the controller 140 may obtain the tilting angle of the trailer 400 using the degree of distortion of the trailer image 810.

For example, the controller 17 may mark a plurality of determination patterns 821 and 822 that are symmetrical to each other on the trailer image 810 acquired by the result of the processing of the image data, identify the degree of distortion of the marked plurality of determination patterns 821 and 822 and calculate the tilting angle of the trailer from a reference axis of the vehicle on the basis of the degree of distortion. Here, the tilting angel of the trailer 400 is calculated on the basis of image processing.

The controller 140 may set at least one of the first rear side warning determination reference area 510 and the second rear side warning determination reference area 520 to correspond to the calculated tilting angle.

For example, the controller 140 may correct the boundary line of the first rear side warning determination reference area 510 to correspond to the tilting angle of the trailer 400 calculated according to the above-described example to thereby set the second rear side warning determination reference region 520.

Hereinafter, a vehicle control method capable of performing the present disclosure will be described.

Figure 9:
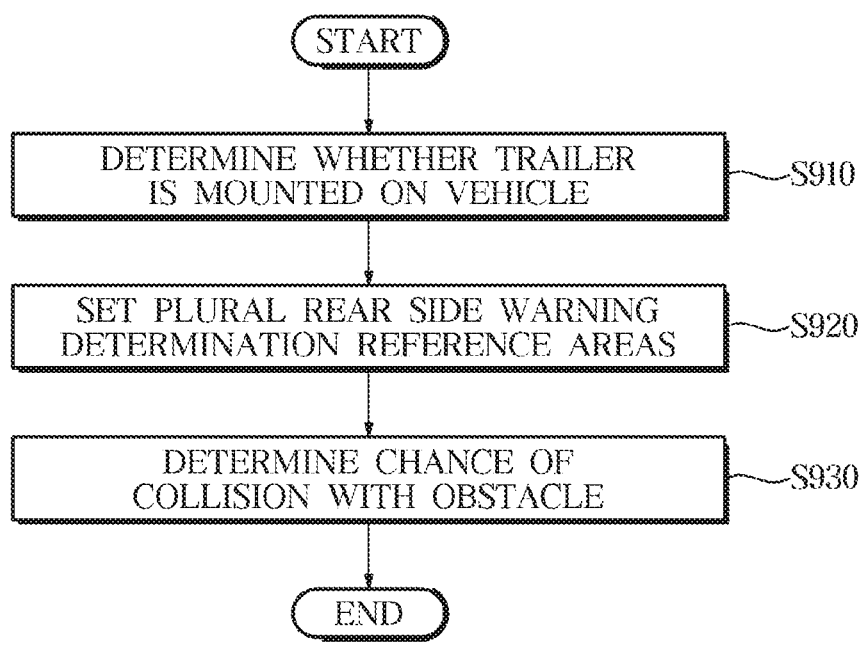
FIG. 9 is a flowchart showing a vehicle control method according to the present disclosure.

FIG. 9 is a flowchart showing a vehicle control method according to the present disclosure.

Referring to FIG. 9, the vehicle control method according to the present disclosure may include determining whether the trailer 400 is mounted on the vehicle 200 on the basis of reception of a trailer mounting signal (S910), changing, in response to determining that the trailer 400 is mounted on the vehicle 200, the previously set rear side warning determination reference area 220 that is previously set before the trailer 400 is mounted on the vehicle 200 to set the plurality of rear side warning determination reference areas 510 and 520 (S920), and determining a chance of a collision with an obstacle with respect to at least one of the set plurality of rear side warning determination reference areas 510 and 520 (S930).

Hereinafter, various embodiments of the rear side warning operation according to the present disclosure will be described.

Figure 10:
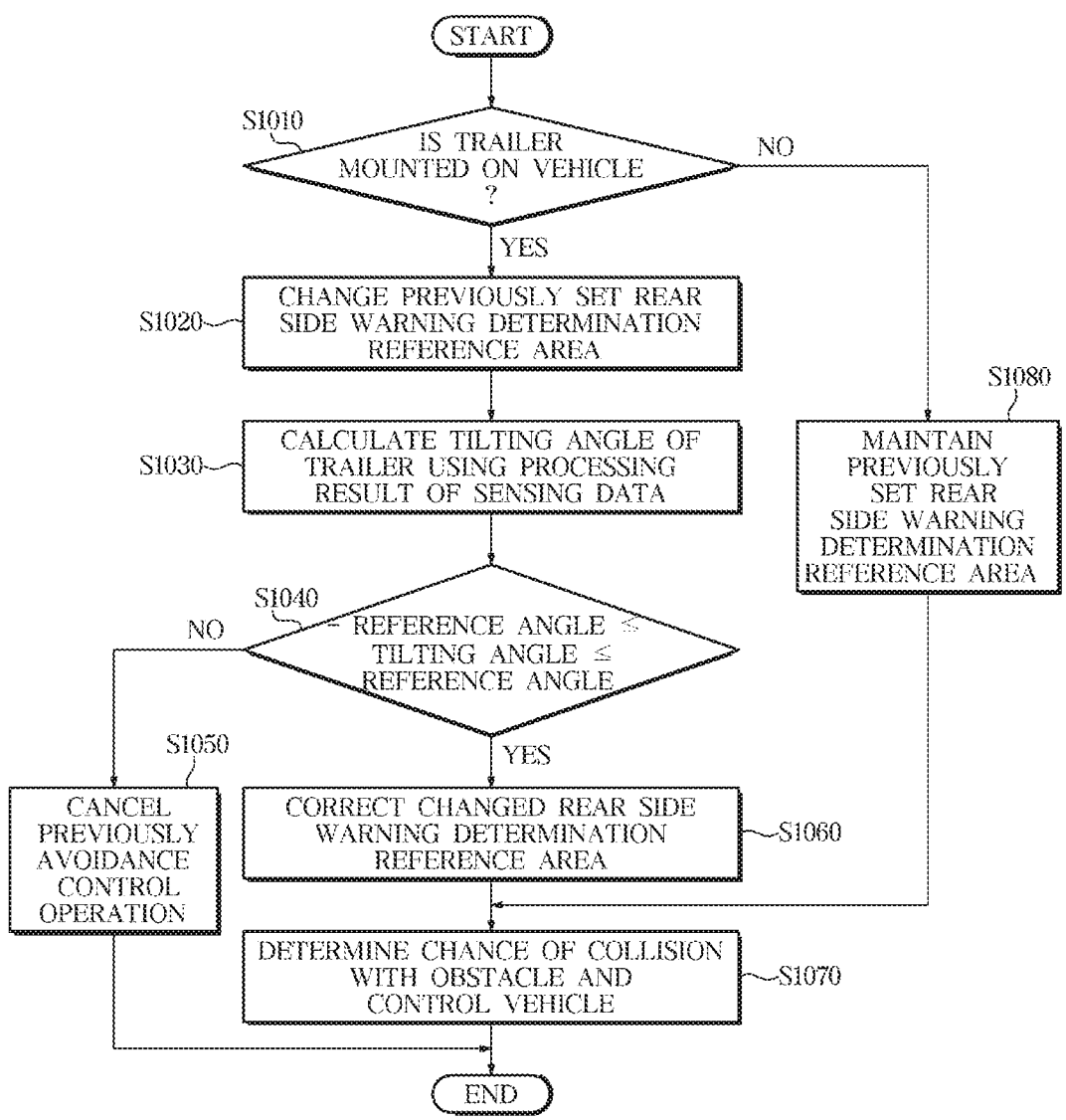
FIG. 10 is a flowchart for specifically describing a first embodiment of a rear side warning operation according to the present disclosure.

FIG. 10 is a flowchart for specifically describing a first embodiment of a rear side warning operation according to the present disclosure.

Referring to FIG. 10, the controller 140 determines whether the trailer 400 is mounted on the vehicle 200 (S1010).

In response to determining that the trailer 400 is mounted on the vehicle 200, the controller 140 changes the previously set rear side warning determination reference area 220 to set the plurality of rear side warning determination reference areas 510 and 520 (S1020).

Thereafter, the controller 140 calculates the tilting angle of the trailer 400 using the result of the processing of the sensing data (S1030). The method of calculating the tilting angle of the trailer 400 is the same as described above with reference to FIG. 7.

When the tilting angle of the trailer 400 is calculated, the controller 140 compares the tilting angle of the trailer 400 acquired on the basis of the result of the processing of the sensing data with a previously set reference angle range (S1040).

When the tilting angle of the trailer 400 is outside of the reference angle range, the controller 140 cancels a collision avoidance control operation (S1050).

In this case, the controller 140 may cancel the collision avoidance control operation and perform a warning control operation for outputting a notification to the driver.

When the tilting angle of the trailer 400 is within the reference angle range, the controller 140 performs a collision avoidance control. In detail, the controller 140 corrects the changed rear side warning determination reference areas 510 and 520 (S1060), determines a chance of a collision with an obstacle approaching the corrected rear side warning determination reference areas, and controls the vehicle 200 according to the chance of a collision (S1070).

For example, the controller 140 calculates a time to collision (TTC) of the obstacle approaching at least one of the plurality of rear side warning determination reference areas 510 and 520, and determines the chance of a collision on the basis of the calculated ITC.

In response to determining that the trailer 400 is not mounted on the vehicle 200, the controller 140 maintains the previously set rear side warning determination reference area 220 (S1080), determines the chance of a collision with an obstacle approaching the maintained rear side warning determination reference area, and controls the vehicle 200 according to the chance of collision (S1070).

Figure 11:
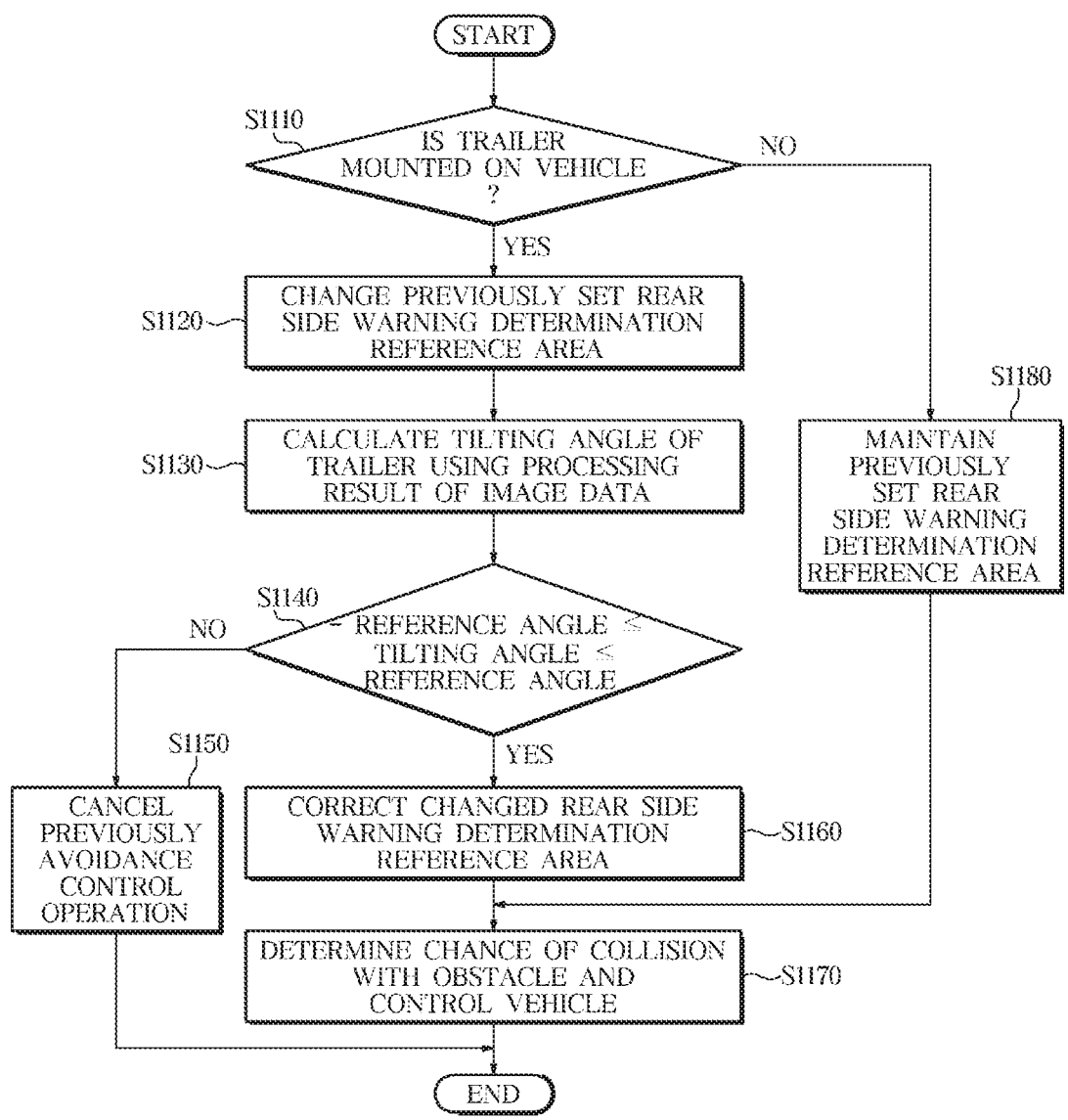
FIG. 11 is a flowchart for specifically describing a second embodiment of a rear side warning operation according to the present disclosure.

FIG. 11 is a flowchart for specifically describing a second embodiment of a rear side warning operation according to the present disclosure.

Referring to FIG. 11, the controller 140 determines whether the trailer 400 is mounted on the vehicle 200 (S1110), and in response to determining that the trailer 400 is mounted on the vehicle 200, changes the previously set rear side warning determination reference area 220 to set the plurality of rear side warning determination reference areas 510 and 520 (S1120).

Thereafter, the controller 140 calculates the tilting angle of the trailer 400 using the result of the processing of the image data (S1130). The method of calculating the tilting angle of the trailer 400 is the same as described above with reference to FIG. 8.

When the tilting angle of the trailer 400 is calculated, the controller 140 compares the tilting angle of the trailer 400 acquired on the basis of the result of the processing of the image data with a previously set reference angle range (S1140).

When the tilting angle of the trailer 400 is outside of the reference angle range, the controller 140 cancels a collision avoidance control operation (S1150).

In this case, the controller 140 may cancel the collision avoidance control operation and perform a warning control operation for outputting a notification to the driver.

When the tilting angle of the trailer 400 is within the reference angle range, the controller 140 performs a collision avoidance control. In detail, the controller 140 corrects the changed rear side warning determination reference areas 510 and 520 (S1160), determines a chance of a collision with an obstacle approaching the corrected rear side warning determination reference areas, and controls the vehicle 200 according to the chance of a collision (S1170).

For example, the controller 140 calculates a time to collision (TTC) of the obstacle approaching at least one of the plurality of rear side warning determination reference areas 510 and 520, and determines the chance of a collision on the basis of the calculated TTC.

In response to determining that the trailer 400 is not mounted on the vehicle 200, the controller 140 maintains the previously set rear side warning determination reference area 220 (S1180), determines the chance of a collision with an obstacle approaching the maintained rear side warning determination reference area, and controls the vehicle 200 according to the chance of collision (S1170).

Figure 12:
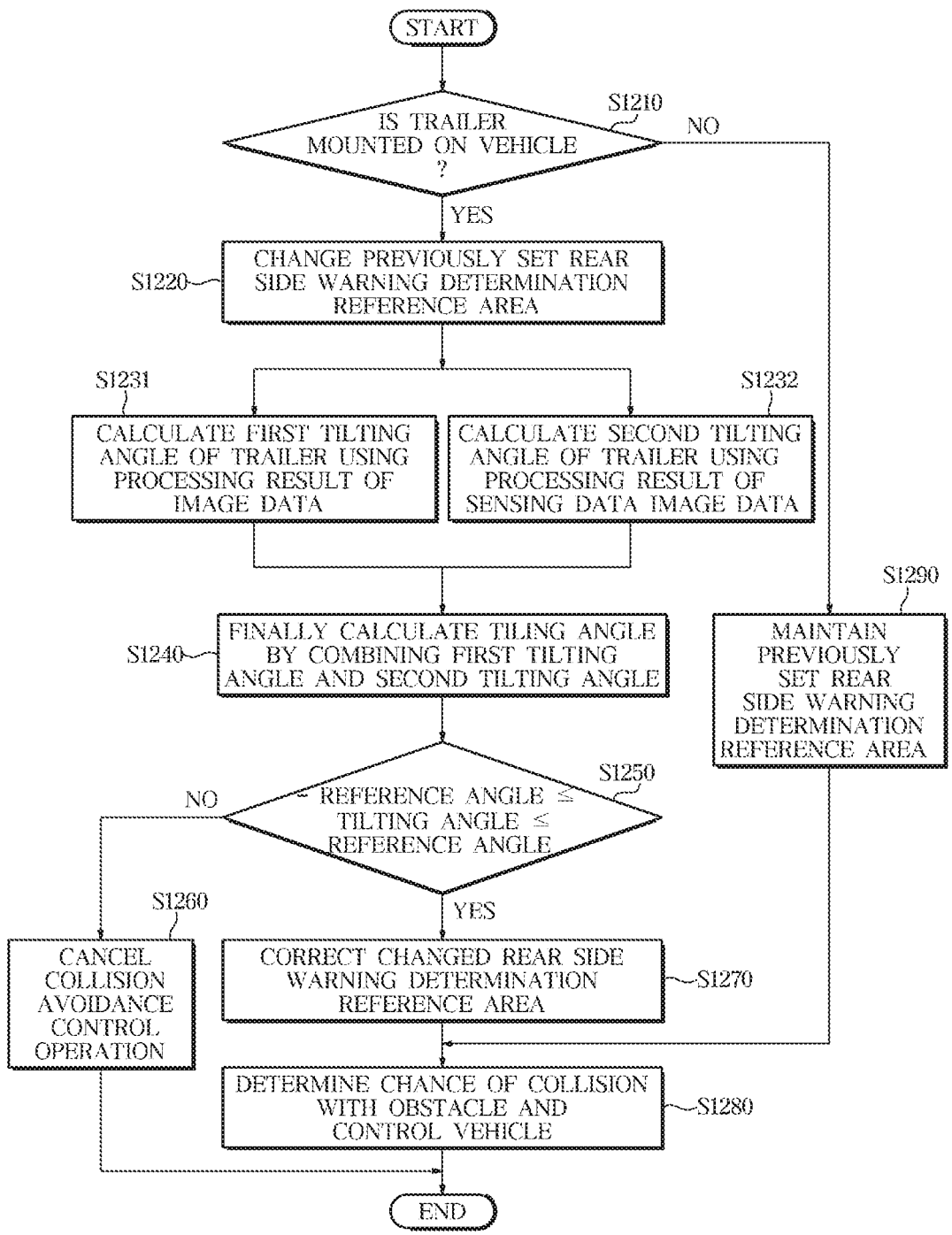
FIG. 12 is a flowchart for specifically describing a third embodiment of a rear side warning operation according to the present disclosure.

FIG. 12 is a flowchart for specifically describing a third embodiment of a rear side warning operation according to the present disclosure.

Referring to FIG. 12, the controller 140 determines whether the trailer 400 is mounted (S1210), and in response to determining that the trailer 400 is mounted on the vehicle 200, changes the previously set rear side warning determination reference area 220 to set the plurality of rear side warning determination reference areas 510 and 520 (S1220).

Thereafter, the controller 140 calculates the tilting angle of the trailer 400 using the result of the processing of at least one of the image data and the sensing data.

For example, the controller 140 calculates a first tilting angle of the trailer 400 using the result of the processing of the image data (S1231), and calculates a second tilting angle of the trailer 400 using the result of the processing of the sensing data (S1232). The method of calculating the first and second tilting angles of the trailer 400 is the same as described above with reference to FIGS. 7 and 8.

Thereafter, the controller 140 finally calculate a tiling angle of the trailer 400 by combining the first tilting angle of the trailer 400 acquired on the basis of the result of the processing of the image data and the second tilting angle of the trailer 400 acquired on the basis of the result of the processing of the sensing data (S1240).

In this case, the controller 140 may set at least one of the first side warning determination reference area and the second side warning determination reference area to correspond to the finally calculated tilting angle of the trailer.

Thereafter, the controller 140 compares the tilting angle of the trailer 400 acquired on the basis of the result of the processing of at least one of the image data and the sensing data with a previously set reference angle range (S1250).

As described above with reference to FIGS. 10 and 11, when the tilting angle of the trailer 400 is outside of the reference angle range, the controller 140 cancels a collision avoidance control operation (S1260).

When the tilting angle of the trailer 400 is within the reference angle range, the controller 140 performs a collision avoidance control. In detail, the controller 140 corrects the changed rear side warning determination reference areas 510 and 520 (S1270), determines a chance of a collision with an obstacle approaching the corrected rear side warning determination reference areas, and controls the vehicle 200 according to the chance of a collision (S1280).

For example, the controller 140 calculates a time to collision (TTC) for an obstacle approaching at least one of the plurality of rear side warning determination reference areas 510 and 520, and determines a chance of a collision on the basis of the calculated TTC.

In response to determining that the trailer 400 is not mounted on the vehicle 200, the controller 140 maintains the previously set rear side warning determination reference area 220 (S1290), determines a chance of a collision with an obstacle approaching the maintained rear side warning determination reference area, and controls the vehicle 200 on the basis of the chance of the collision (S1280).

As is apparent from the above, the present disclosure can provide a vehicle control system, an image sensor, and a vehicle control method capable of preventing an erroneous control by changing a criterion for determining a warning situation even when a trailer is mounted on a vehicle, The present disclosure can provide a vehicle control system, an image sensor, and a vehicle control method capable of providing the driver with driving stability and driving convenience by avoiding an obstacle approaching the vehicle from the rear side of the vehicle.

The above description of the present disclosure is for illustrative purposes, and a person having ordinary skilled in the art should appreciate that other specific modifications may be easily made without departing from the technical spirit or essential features of the present disclosure. Therefore, the above embodiments should be regarded as illustrative rather than limitative in all aspects. For example, suitable results may be achieved even when the described techniques are performed in a different order and/or components in a described system, structure, apparatus, circuit and the like are combined in a different manner and/or replaced or supplemented by other components or their equivalents. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:

1. A vehicle control system comprising:
an image sensor disposed on a vehicle to have a field of view of an outside of the vehicle to capture image data;
at least one non-image sensor disposed on the vehicle to have a field of sensing of the outside of the vehicle to capture sensing data,
at least one processor configured to process the image data captured by the image sensor and the sensing data captured by the at least one non-image sensor; and
a controller configured to determine, based at least in part on processing at least one of the image data and the sensing data, a chance of a collision with an obstacle with respect to a rear side warning determination reference area that is changed depending on whether a trailer is mounted on the vehicle,
wherein the controller is configured to:
determine whether the trailer is mounted on the vehicle on the basis of reception of a trailer mounting signal,
change, in response to determining that the trailer is mounted on the vehicle, a rear side warning determination reference area that is previously set before the trailer is mounted on the vehicle, to thereby set a plurality of rear side warning determination reference areas,
wherein the controller is configured to:
mark a plurality of determination patterns symmetrical to each other on an image of the trailer that is acquired by a result of the processing of the image data;
identify a degree of distortion of the marked plurality of determination patterns and calculate a tilting angle of the trailer with respect to a reference axis of the vehicle on the basis of the degree of distortion; and
set at least one of the plurality of rear side warning determination reference areas to correspond to the calculated tilting angle, and
wherein
the plurality of rear side warning determination reference areas includes: a first rear side warning determination reference area and a second rear side warning determination reference area, and
the first rear side warning determination reference area is set in front of the second rear side warning determination reference area along the driving direction of the vehicle.

2. The vehicle control system of claim 1, wherein the controller is configured to:
check an overlap area of the previously set rear side warning determination area that overlaps the trailer; and
set an area of the previously set rear side warning determination reference area that excludes the overlap area as the first rear side warning determination reference area of the plurality of rear side warning determination reference areas.

3. The vehicle control system of claim 2, wherein the controller is configured to
determine a longitudinal length of the first rear side warning determination reference area on the basis of at least one of: a distance between the vehicle and the trailer that is acquired by a result of the processing of the at least one of the image data and the sensing data; or previously stored information about a size of a connecting shaft; and
determine a traverse length of the first rear side warning determination reference area on the basis of at least one of a traverse length of the trailer and a previously stored traverse length of the vehicle.

4. The vehicle control system of claim 3, wherein the controller is configured to:
extract the traverse length of the trailer from the trailer mounting signal when the trailer mounting signal includes size information about a size of the trailer; and
estimate the traverse length of the trailer from the result of the processing of the at least one of the image data and the sensing data or from previously stored trailer average size information when the trailer mounting signal does not include the size information about the size of the trailer.

5. The vehicle control system of claim 1, wherein the controller sets, among the plurality of rear side warning determination reference areas, the second rear side warning determination reference area corresponding to a position of the trailer,
wherein
a longitudinal length of the second rear side warning determination reference area is determined by adding at least one of a previously set first calibration length and a longitudinal length of the vehicle to a longitudinal length of the trailer; and
a traverse length of the second rear side warning determination reference area is determined by adding at least one of a previously set second calibration length and a traverse length of the vehicle to a traverse length of the trailer.

6. The vehicle control system of claim 5, wherein the controller is configured to:
extract the longitudinal length and the traverse length of the trailer from the trailer mounting signal when the trailer mounting signal includes size information about the size of the trailer; and
estimate the longitudinal length and the traverse length of the trailer from a result of the processing of the at least one of the image data and the sensing data or from previously stored trailer average size information when the trailer mounting signal does not include the size information about the size of the trailer.

7. The vehicle control system of claim 1, wherein the at least one non-image sensor includes a first non-image sensor configured to capture first sensing data and a second non-image sensor configured to capture second sensing data,
wherein the controller is configured to:
calculate a tilting angle of the trailer with respect to a reference axis of the vehicle using a previously stored interval between the first non-image sensor and the second non-image sensor, a first distance between the first non-image sensor and the trailer acquired by a result of the processing of the first sensing data, and a second distance between the second non-image sensor and the trailer acquired by a result of the processing of the second sensing data; and set the first rear side warning determination reference area to correspond to the calculated tilting angle.

8. The vehicle control system of claim 1, wherein the controller is configured to:
finally calculate a tilting angle of the trailer by combining a first angle at which the trailer is tilted and which is acquired on the basis of a result of the processing of the image data with a second angle at which the trailer is tilted and which is acquired on the basis of a result of the processing of the sensing data; and
set the first rear side warning determination reference area to correspond to the finally calculated tilting angle.

9. The vehicle control system of claim 1, wherein the controller is configured to:
compare a tilting angle of the trailer acquired on the basis of a result of the processing of at least one of the image data and the sensing data with a previous set reference angle range;
performing a collision avoidance control when the tilting angle of the trailer is within the previous set reference angle range; and
cancel the collision avoidance control when the tilting angle of the trailer is outside of the previous set reference angle range.

10. The vehicle control system of claim 1, wherein the controller is configured to calculate a time to collision (TTC) with respect to the obstacle approaching at least one of the plurality rear side warning determination reference areas, and predict a collision on the basis of calculated TTC.

11. A vehicle control system comprising:
an image sensor disposed on a vehicle to have a field of view of an outside of the vehicle to capture image data;
at least one non-image sensor disposed on the vehicle to have a field of sensing of the outside of the vehicle to capture sensing data;
a rear side warning module configured to prevent an obstacle approaching the vehicle from a rear side of the vehicle; and
a domain control unit configured to process at least one of the image data captured by the image sensor and the sensing data captured by the at least one non-image sensor, and to control at least one driving assistance system including the rear side warning module, the at least one driving assistance system being provided in the vehicle,
wherein the domain control unit is configured to
determine whether a trailer is mounted on the vehicle on the basis of reception of a trailer mounting signal, and
change, in response to determining that the trailer is mounted on the vehicle, a rear side warning determination reference area that is previously set before the trailer is mounted on the vehicle, to thereby set a plurality of rear side warning determination reference areas,
wherein the domain control unit is configured to:
mark a plurality of determination patterns symmetrical to each other on an image of the trailer that is acquired by a result of the processing of the image data;
identify a degree of distortion of the marked plurality of determination patterns and calculate a tilting angle of the trailer with respect to a reference axis of the vehicle on the basis of the degree of distortion; and
set at least one of the plurality of rear side warning determination reference areas to correspond to the calculated tilting angle, and
wherein
the plurality of rear side warning determination reference areas includes: a first rear side warning determination reference area and a second rear side warning determination reference area, and
the first rear side warning determination reference area is set in front of the second rear side warning determination reference area along the driving direction of the vehicle.

12. The vehicle control system of claim 11, wherein the domain control unit is configured to:
check an overlap area of the previously set rear side warning determination area that overlaps the trailer; and
set an area of the previously set rear side warning determination reference area that excludes the overlap area as a first rear side warning determination area among the plurality of rear side warning determination reference areas.

13. The vehicle control system of claim 12, wherein the domain control unit is configured to
determine a longitudinal length of the second rear side warning determination reference area on the basis of at least one of: a distance between the vehicle and the trailer that is acquired by a result of the processing of the at least one of the image data and the sensing data; or previously stored information about a size of a connecting shaft; and
determine a traverse length of the first rear side warning determination reference area on the basis of at least one of a traverse length of the trailer and a previously stored traverse length of the vehicle.

14. The vehicle control system of claim 11, wherein the domain control unit sets the second rear side warning determination reference area corresponding to a position of the trailer,
wherein
a longitudinal length of the second rear side warning determination reference area is determined by adding at least one of a previously set first calibration length and a longitudinal length of the vehicle to a longitudinal length of the trailer; and
a traverse length of the second rear side warning determination reference area is determined by adding at least one of a previously set second calibration length and a traverse length of the vehicle to a traverse length of the trailer.

15. The vehicle control system of claim 11, wherein the non-image sensor includes a first non-image sensor configured to capture first sensing data and a second non-image sensor configured to capture second sensing data,
wherein the domain control unit is configured to:
calculate a tilting angle of the trailer with respect to a reference axis of the vehicle using a previously stored interval between the first non-image sensor and the second non-image sensor, a first distance between the first non-image sensor and the trailer acquired by a result of the processing of the first sensing data, and a second distance between the second non-image sensor and the trailer acquired by a result of the processing of the second sensing data; and
set the first rear side warning determination reference area to correspond to the calculated tilting angle.

16. The vehicle control system of claim 11, wherein the domain control unit is configured to:

compare a tilting angle of the trailer acquired on the basis of a result of the processing of at least one of the image data and the sensing data with a previous set reference angle range;

perform a collision avoidance control when the tilting angle of the trailer is within the previous set reference angle range; and cancel the collision avoidance control when the tilting angle of the trailer is outside of the previous set reference angle range.

17. An image sensor disposed on a vehicle to have a field of view of an outside of the vehicle to capture image data, wherein the image data is processed by a processor to be used for setting a plurality of rear side warning determination reference areas by changing a previously set rear side warning determination reference area, wherein the plurality of rear side warning determination reference areas includes:

a first rear side warning determination reference area that is set to correspond to an area of the previously set rear side warning determination reference area that is offset by an overlap area of the previously set rear side warning determination reference area that overlaps a trailer; and a second rear side warning determination reference area that is set to corresponding to a position of the trailer, and wherein the processor is configured to:

mark a plurality of determination patterns symmetrical to each other on an image of the trailer that is acquired by a result of the processing of the image data;

identify a degree of distortion of the marked plurality of determination patterns and calculating a tilting angle of the trailer with respect to a reference axis of the vehicle on the basis of the degree of distortion; and set at least one of the plurality of rear side warning determination reference areas to correspond to the calculated tilting angle, and wherein the first rear side warning determination reference area is set in front of the second rear side warning determination reference area along the driving direction of the vehicle.

* * * * *